United States Patent [19]
Katell

[11] 3,713,975
[45] Jan. 30, 1973

[54] NUCLEAR REACTOR FUEL ELEMENT

[75] Inventor: Abraham Katell, Loudonville, N.Y.

[73] Assignee: RL Industries, Inc., New York, N.Y.

[22] Filed: Dec. 2, 1969

[21] Appl. No.: 881,492

[52] U.S. Cl. .................................. 176/79, 176/81
[51] Int. Cl. ............................................ G21c 3/18
[58] Field of Search ........................ 176/68, 79, 81

[56] References Cited

UNITED STATES PATENTS

| | | | |
|---|---|---|---|
| 3,378,458 | 4/1968 | Ross et al. ................................ 176/79 |
| 3,274,067 | 9/1966 | Greebler et al. ......................... 176/68 |
| 3,365,371 | 1/1968 | Lass et al. ................................ 176/66 |
| 3,431,170 | 3/1969 | Lass et al. ................................ 176/79 X |
| 3,466,226 | 9/1969 | Lass et al. ................................ 176/68 |
| 3,275,525 | 9/1966 | Bloomster et al. ...................... 176/73 |
| 3,310,474 | 3/1967 | Saunders ................................. 176/79 X |
| 3,505,170 | 4/1970 | Flowers et al. .......................... 176/68 X |

*Primary Examiner*—Carl D. Quarforth
*Assistant Examiner*—Gary G. Solyst
*Attorney*—Charles F. Kaegebehn, Robert L. Lehman and Fred Floersheimer

[57] ABSTRACT

A nuclear reactor fuel element includes a tube having end plugs sealing the ends thereof. A body of nuclear fuel is disposed in part of the tube and defines a plenum chamber adjacent one of the end plugs. A plenum compression spring has one end in engagement with a flat disc-like member which engages the body of nuclear fuel. The opposite end of the plenum spring is in engagement with a flat surface formed on a spring seat means including a substantially conical portion which has single point contact with the central part of the inner surface of the adjacent end plug.

2 Claims, 2 Drawing Figures

PATENTED JAN 30 1973　　　　　　　　　　　　　3,713,975

INVENTOR
ABRAHAM KATELL

NUCLEAR REACTOR FUEL ELEMENT

BACKGROUND OF THE INVENTION

The present invention relates to an improvement in a nuclear reactor fuel element employed in a nuclear fission reactor.

The fuel element of the present invention is of the type including a plenum chamber which is provided for collecting fission product gases given off by the nuclear fuel during nuclear reaction. A plenum spring is disposed within such plenum chamber to apply a force against an adjacent end plug of the fuel element and the body of nuclear fuel disposed within the fuel element.

A particular problem with fuel elements of this type is the failure of the structural and mechanical integrity of the weld joint between one end plug and the tube at the plenum end of the fuel element.

In the past, constructions have been employed wherein the plenum spring was in intimate contact with a substantial portion of the end plug at the plenum end of the fuel element. When such end plug was welded to the tube of the fuel element, a substantial amount of heat was transferred from the end plug to the plenum spring in engagement therewith, such heat exceeding the eutectic temperature of the materials from which the end plug and the plenum spring were made thereby forming a eutectic alloy which mixed with the molten weld material and contaminated the weld such that it became brittle and subject to corrosion. Additionally, cracks formed in the weld region when the fuel element was in use thereby allowing the fission product gases to escape into the coolants of the reactor causing contamination of various parts of the reactor and the coolant circuit.

Various efforts have been made to overcome this problem, and a recent development is disclosed in U. S. Pat. No. 3,378,458 which discloses a construction wherein the plenum spring is provided with a 90° turned up end loop which is in contact with the center region of the flat inner surface of the adjacent end plug. Such a construction substantially increases the length of the heat path from the weld area to the spring and the spring only engages spaced portions of the center region of the associated end plug.

This type of deformed spring arrangement is, however, objectionable since it is quite expensive and the spring itself is subject to overstress failure. Accordingly, it is an objective of the present invention to substantially reduce the probability of melting the plenum spring during welding and further ensuring that even if the eutectic temperature of the plenum spring and the end plug is exceeded, the resultant molten material is sufficiently remote from the weld region to prevent weld contamination, while at the same time substantially reducing the production cost and eliminating the possibility of overstress failure of the plenum spring.

SUMMARY OF THE INVENTION

In the present invention, a spring seat means is interposed between and engages one end of the plenum spring and the inner surface of the end plug at the plenum end of the tube of the fuel element. This spring seat means is a separate member including a tapered conical portion having single point contact only with the central part of the inner surface of the associated end plug.

The single point contact provided between the spring seat means of the present invention and the inner surface of the associated end plug still further reduces the area of contact as compared with the arrangement as shown in the aforementioned patent. The spring seat means also includes a flat surface which engages the flattened end of a standard shaped helical compression spring thereby enabling a conventional relatively inexpensive compression spring to be employed which substantially reduces production costs and further avoids the possibility of overstress failure of the plenum spring.

The spring seat means transfers heat during welding only from the central part of the end plug which is the coolest region of the plug's inner surface thereby minimizing the thermal effect on the plenum spring. The spring seat means which has high inherent structural strength has the further advantage that it is loosely dimensioned inexpensive screw machine product and requires no special tooling for its production.

DESCRIPTION OF THE PREFERRED EMBODIMENT

Figure 1:
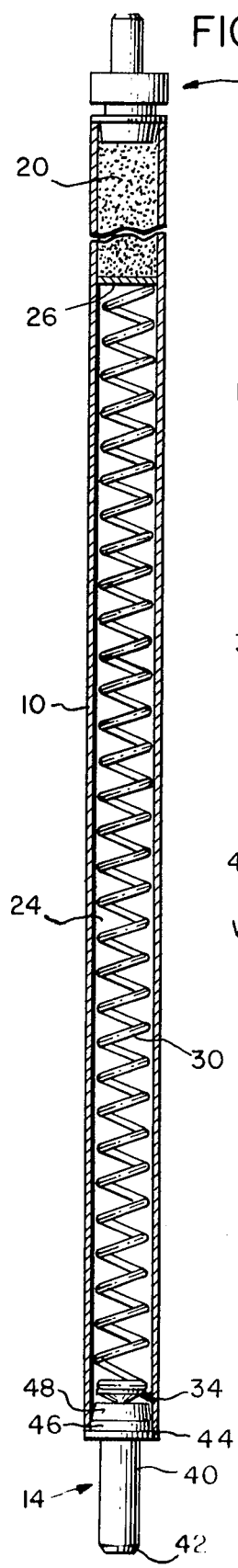
FIG. 1 is a side elevation, partly in section, of a fuel element according to the present invention.
Figure 2:
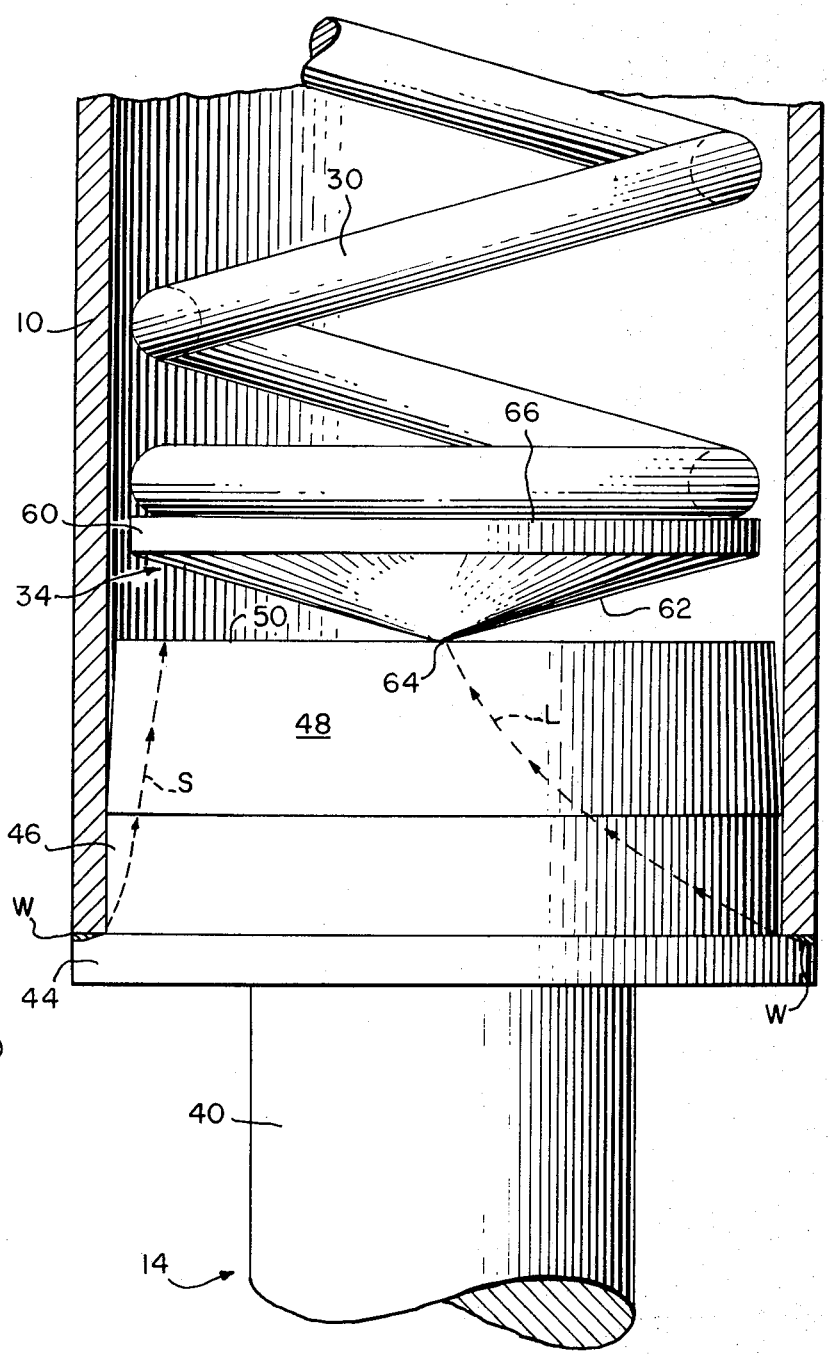
FIG. 2 is an enlarged view of one end of the fuel element illustrating the novel spring seat means interposed between the plenum spring and the adjacent end plug.

Referring now to the drawing wherein like reference characters designate corresponding parts throughout the several views, as seen in FIG. 1, the fuel element includes an elongated cylindrical tube 10 which is preferably made of an alloy of zirconium such as marketed under the trade name "Zircalloy." Opposite ends of tube 10 are sealed by end plugs 12 and 14 each of which may be formed of the same material as the tube. These end plugs are welded or fused to the opposite ends of the tube to prevent the reactor coolant from contacting the fuel and to further prevent fission product gas from escaping from the fuel element.

A body 20 of fissionable fuel material such as uranium is disposed in part of the tube. This fuel may be in the form of pellets, powder or particles and the like. A plenum chamber 24 is defined within the remainder of the tube and adjacent end plug 14, a disc-like member 26 being provided to prevent fuel particles or chips from entering the plenum chamber.

A plenum compression spring 30 is disposed within the plenum chamber and extends between the body of nuclear fuel and end plug 14. One end of plenum spring 30 engages disc-like member 26, the opposite end of the plenum spring engaging a spring seat means 34 which in turn engages end plug 14. Spring seat means 34 is preferably formed of the same material as the associated end plug, whereas the plenum spring 30 may be formed of steel or other material having suitable spring characteristics. The spring preferably has a helical configuration with the outside diameter thereof being less than the inside diameter of the tube.

End plug 14 is of integral construction and includes an elongated cylindrical shank 40 having a tapered end 42 to facilitate insertion into an associated tie plate in a typical fuel assembly. The end plug includes a cylindrical collar 44 having a diameter substantially equal to the outer diameter of the tube. The end plug also includes a substantially cylindrical portion 46 which fits snugly within the inner diameter of the tube, 46 merging with a portion 48 having an outer surface substantially frusto-conical in configuration. The end plug terminates in a flat inner surface 50 extending substantially perpendicular to the longitudinal axis of the tube. The end plug is welded to the end of the tube in an annular area indicated by reference character W so as to effectively seal off the end of the tube.

The spring seat means includes a generally cylindrical portion 60 and a tapered substantially conical portion 62 which tapers to a point 64 so as to provide only a single point contact with the central part of the inner surface 50 of the associated end plug. The spring seat means also includes a flat surface 66 which engages the flattened end of plenum spring 30.

Dotted line S indicates a short heat path from the weld joint W to the inner surface 50 of the end plug, while dotted line L indicates a long heat path from the weld joint to the point of contact between the spring seat means and the inner surface of the end plug. It is apparent that the arrangement of the present invention serves to isolate the plenum spring from the welding heat thereby improving the reliability of the welded joint.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

What is claimed is:

1. A nuclear reactor fuel element comprising a tube, an end plug sealing each end of said tube, a body of nuclear fuel disposed in part of said tube and defining a plenum chamber within said tube adjacent one of said end plugs, a plenum compression spring in said plenum chamber and extending between said body of nuclear fuel and said one end plug, said one end plug having an inner surface, and separate spring seat means interposed between and engaging one end of said spring and said inner surface of said one end plug, said spring seat means including a tapered substantially conical portion having only a single point contact with the central part of said inner surface of said one end plug.

2. A nuclear reactor fuel element comprising a tube, an end plug sealing each end of said tube, a body of nuclear fuel disposed in part of said tube and defining a plenum chamber within said tube adjacent one of said end plugs, a plenum compression spring of said plenum chamber and extending between said body of nuclear fuel and said one end plug, said one end plug having an inner surface and separate spring seat means interposed between and engaging one end of said spring and said inner surface of said one end plug, said spring seat means including a tapered portion having a part thereof in single point contact with said one end plug, said spring seat means also including a substantially flat surface engaging said one end of the spring.

* * * * *

UNITED STATES PATENT OFFICE
CERTIFICATE OF CORRECTION

Patent No. 3,713,975     Dated January 30, 1973

Inventor(s) Abraham Katell

It is certified that error appears in the above-identified patent and that said Letters Patent are hereby corrected as shown below:

Cover page [73 "RL Industries, Inc., New York, N. Y." should read -- N L Industries, Inc., New York, N. Y. --.

Column 3, line 5, "frusto-conical" should read -- fruste-conical --.

Signed and sealed this 5th day of November 1974.

(SEAL)
Attest:

McCOY M. GIBSON JR.             C. MARSHALL DANN
Attesting Officer               Commissioner of Patents